United States Patent
Shimokuri et al.

(10) Patent No.: US 9,181,458 B2
(45) Date of Patent: Nov. 10, 2015

(54) METHOD FOR MANUFACTURING OPTICAL FILM-FORMING PRESSURE-SENSITIVE ADHESIVE LAYER, OPTICAL FILM-FORMING PRESSURE-SENSITIVE ADHESIVE LAYER, PRESSURE-SENSITIVE ADHESIVE-TYPE OPTICAL FILM, AND IMAGE DISPLAY DEVICE

(71) Applicant: NITTO DENKO CORPORATION, Ibaraki-shi, Osaka (JP)

(72) Inventors: Taiki Shimokuri, Ibaraki (JP); Kunihiro Inui, Ibaraki (JP); Toshitaka Takahashi, Ibaraki (JP); Yousuke Makihata, Ibaraki (JP); Toshitsugu Hosokawa, Ibaraki (JP); Takaaki Ishii, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 244 days.

(21) Appl. No.: 13/626,159

(22) Filed: Sep. 25, 2012

(65) Prior Publication Data

US 2013/0078407 A1 Mar. 28, 2013

(30) Foreign Application Priority Data

Sep. 26, 2011 (JP) .................................. 2011-209331

(51) Int. Cl.
*B05D 5/10* (2006.01)
*C09J 7/02* (2006.01)
*C09J 133/08* (2006.01)

(52) U.S. Cl.
CPC .............. *C09J 7/0217* (2013.01); *C09J 133/08* (2013.01); *C09J 2201/622* (2013.01); *Y10T 428/1476* (2015.01)

(58) Field of Classification Search
CPC ......... B05D 5/10; B32B 33/00; C09J 133/10; C09J 7/02
USPC ..................................................... 427/207.1
See application file for complete search history.

(56) References Cited

U.S. PATENT DOCUMENTS

| | | | |
|---|---|---|---|
| 2006/0188712 A1 | 8/2006 | Okada et al. | |
| 2008/0281038 A1* | 11/2008 | Takahashi et al. ............. | 524/602 |
| 2009/0017298 A1* | 1/2009 | Okada et al. ................... | 428/354 |
| 2009/0068459 A1* | 3/2009 | Kishioka et al. ........ | 428/355 CN |
| 2010/0143634 A1* | 6/2010 | Yasui et al. .................. | 428/41.8 |
| 2010/0304135 A1 | 12/2010 | Okada et al. | |
| 2012/0064339 A1 | 3/2012 | Yamagata et al. | |
| 2012/0064340 A1* | 3/2012 | Inui et al. ................ | 428/355 AC |
| 2012/0251821 A1 | 10/2012 | Hosokawa et al. | |

FOREIGN PATENT DOCUMENTS

| | | | | |
|---|---|---|---|---|
| CN | 1827725 A | 9/2006 | | |
| JP | 08-218047 A | 8/1996 | | |
| JP | 2004-143294 A | 5/2004 | | |
| JP | 2004-269699 A | 9/2004 | | |
| JP | 2005-247955 A | 9/2005 | | |
| JP | 2005-320487 A | 11/2005 | | |
| JP | 2008-163127 A | 7/2008 | | |
| JP | 2008-302580 A | 12/2008 | | |
| JP | 2010-1415 A | 1/2010 | | |
| TW | 201038694 A1 | 11/2010 | | |
| WO | WO/2010/140450 | * | 12/2010 | ............... G02B 5/30 |
| WO | 2011/070870 A1 | 6/2011 | | |

OTHER PUBLICATIONS

Korean Notice of Allowance dated Jun. 24, 2014, issued in corresponding Korean Patent Application No. 10-2012-0106346 (2 pages).
Chinese Office Action dated Jul. 3, 2014, issued in corresponding Chinese Patent Application No. 201210364698.6 with English translation (18 pages).
Taiwanese Office Action dated Oct. 14, 2014, issued in corresponding Taiwanese Application No. 101134710; w/ English Translation. (11 pages).
Chinese Office Action dated Aug. 26, 2013, issued in corresponding Chinese Application No. 201210364698.6 w/ English Translation. (21 pages).
Japanese Office Action dated Mar. 3, 2015, issued in corresponding Jp Patent Application No. 2011-209331 with English translation (8 pages).

* cited by examiner

*Primary Examiner* — Xiao Zhao
(74) *Attorney, Agent, or Firm* — Westerman, Hattori, Daniels & Adrian, LLP

(57) ABSTRACT

An object of the present invention is to provide a method for manufacturing an optical film-forming pressure-sensitive adhesive layer, which can reduce the problem with visibility without a reduction in productivity, such as a reduction in coating speed. A method for manufacturing an optical film-forming pressure-sensitive adhesive layer, comprising the steps of: (1) applying, to a release film, an aqueous dispersion-type pressure-sensitive adhesive including an aqueous dispersion containing a (meth)acryl-based polymer in the form of an aqueous dispersion; and (2) drying the applied aqueous dispersion-type pressure-sensitive adhesive, wherein the aqueous dispersion-type pressure-sensitive adhesive has a viscosity of 0.01 Pa·s to 0.1 Pa·s at a shear rate of 4,000 (1/s), the optical film-forming pressure-sensitive adhesive layer formed on the release film has a surface roughness (Ra) of 10 nm to 40 nm, and the optical film-forming pressure-sensitive adhesive layer has a haze of 1% or less.

16 Claims, No Drawings

METHOD FOR MANUFACTURING OPTICAL FILM-FORMING PRESSURE-SENSITIVE ADHESIVE LAYER, OPTICAL FILM-FORMING PRESSURE-SENSITIVE ADHESIVE LAYER, PRESSURE-SENSITIVE ADHESIVE-TYPE OPTICAL FILM, AND IMAGE DISPLAY DEVICE

BACKGROUND OF THE INVENTION

1. Field of the Invention

The present invention relates to a method for manufacturing an optical film-forming pressure-sensitive adhesive layer using an aqueous dispersion-type pressure-sensitive adhesive. The present invention also relates to an optical film-forming pressure-sensitive adhesive layer obtained by the manufacturing method and to a pressure-sensitive adhesive-type optical film including an optical film and the pressure-sensitive adhesive layer placed thereon. The present invention also relates to an image display device such as a liquid crystal display device, an organic electroluminescence (EL) display device, a cathode-ray tube (CRT), or a plasma display panel (PDP) produced using the pressure-sensitive adhesive-type optical film and to a part used together with an image display device, such as a front face plate, produced using the pressure-sensitive adhesive-type optical film. Examples of the optical film that may be used include a polarizing plate, a retardation plate, an optical compensation film, a brightness enhancement film, a surface treatment film such as an anti-reflection film, and a laminate of any combination thereof.

2. Description of the Related Art

Liquid crystal display devices, organic EL display devices, etc. have an image-forming mechanism including polarizing elements as essential components. For example, therefore, in a liquid crystal display device, polarizing elements are essentially placed on both sides of a liquid crystal cell, and generally, polarizing plates are attached as the polarizing elements. Besides polarizing plates, various optical elements have been used in display panels such as liquid crystal panels and organic EL panels for improving display quality. Front face plates are also used to protect image display devices such as liquid crystal display devices, organic EL display devices, CRTs, and PDPs or to provide a high-grade appearance or a differentiated design. Examples of parts used in image display devices such as liquid crystal display devices and organic EL display devices or parts used together with image display devices, such as front face plates, include retardation plates for preventing discoloration, viewing angle-widening films for improving the viewing angle of liquid crystal displays, brightness enhancement films for increasing the contrast of displays, and surface treatment films such as hard-coat films for use in imparting scratch resistance to surfaces, antiglare treatment films for preventing glare on image display devices, and anti-reflection films such as anti-reflective films and low-reflective films. These films are generically called optical films.

When such optical films are bonded to a display panel such as a liquid crystal cell or an organic EL panel or bonded to a front face plate, a pressure-sensitive adhesive is generally used. In the process of bonding an optical film to a display panel such as a liquid crystal cell or an organic EL panel or to a front face plate or bonding optical films together, a pressure-sensitive adhesive is generally used to bond the materials together so that optical loss can be reduced. In such a case, a pressure-sensitive adhesive-type optical film including an optical film and a pressure-sensitive adhesive layer previously formed on one side of the optical film is generally used, because it has some advantages such as no need for a drying process to fix the optical film.

Conventionally, organic solvent-type pressure-sensitive adhesives have been dominantly used for forming the pressure-sensitive adhesive layer of such a pressure-sensitive adhesive-type optical film, because of their high durability in heated or heated and humid environments. Organic solvent-type pressure-sensitive adhesives that are generally used include acryl-based pressure-sensitive adhesives, which are colorless and transparent and have good tackiness to display panels such as liquid crystal cells and organic EL panels or to front face plates. It has been proposed that the pressure-sensitive adhesive layer should have a controlled surface state from various points of view.

The organic solvent-type pressure-sensitive adhesives are solutions with low solid concentrations (generally about 10 to 15% by weight) and therefore are more likely to form coatings with reduced surface smoothness due to uneven drying or uneven air flow, which can affect the visibility of pressure-sensitive adhesive layers made from such solutions. For example, it is proposed that the thickness and surface roughness of a pressure-sensitive adhesive layer formed by coating should be controlled so that the pressure-sensitive adhesive layer can have reduced irregularities and improved visibility (JP-A-2008-302580). Unfortunately, the disclosure in JP-A-2008-302580 has a problem in which the improvements involve a reduction in productivity, such as a reduction in drying temperature or coating speed.

In recent years, solvent-free pressure-sensitive adhesives, which are produced with no organic solvent, have been developed aggressively in view of a reduction in global environmental loading or an improvement in process stability. Proposed solvent-free pressure-sensitive adhesives include aqueous dispersion-type pressure-sensitive adhesives containing a pressure-sensitive adhesive component dispersed in water used as a dispersion medium. For example, it is proposed that the surface tension of an aqueous dispersion-type pressure-sensitive adhesive should be controlled in order to form a smooth pressure-sensitive adhesive layer (JP-A-2005-320487). Although the method of JP-A-2005-320487 makes it possible to make a smooth pressure-sensitive adhesive layer from an aqueous dispersion-type pressure-sensitive adhesive, optical film-forming pressure-sensitive adhesive layers have been required to have further improved smoothness and higher visibility. There is also proposed an aqueous dispersion-type acryl-based pressure-sensitive adhesive composition containing an acryl-based copolymer emulsion with controlled solid concentration, average particle size, and viscosity (JP-A-08-218047). JP-A-08-218047 discloses that spew- or shrink-free smooth coating surfaces required for Japanese paper tape applications can be obtained. Unfortunately, the level of smoothness disclosed in JP-A-08-218047 is not enough for optical film applications, and the disclosure in JP-A-08-218047 does not satisfy the smoothness required of optical film-forming pressure-sensitive adhesive layers.

SUMMARY OF THE INVENTION

Problem to be Solved by the Invention

An object of the present invention is to provide a method for manufacturing an optical film-forming pressure-sensitive adhesive layer, that is applicable to image display devices such as liquid crystal display devices, which can be formed using an aqueous dispersion-type pressure-sensitive adhesive, and also can reduce the problem with visibility without a reduction in productivity, such as a reduction in coating speed. Another object of the present invention is to provide an optical film-forming pressure-sensitive adhesive layer obtained by the manufacturing method.

Another object of the invention is to provide a pressure-sensitive adhesive-type optical film including an optical film and the optical film-forming pressure-sensitive adhesive layer placed on at least one side of the optical film. A further object of the invention is to provide an image display device including the pressure-sensitive adhesive-type optical film.

As a result of earnest studies to solve the above problems, the inventors have accomplished the invention based on the finding that the method for manufacturing an optical film-forming pressure-sensitive adhesive layer etc., described below can solve the problems.

The invention relates to a method for manufacturing an optical film-forming pressure-sensitive adhesive layer, comprising the steps of:

(1) applying, to a release film, an aqueous dispersion-type pressure-sensitive adhesive including an aqueous dispersion containing a (meth)acryl-based polymer in the form of an aqueous dispersion; and (2) drying the applied aqueous dispersion-type pressure-sensitive adhesive, wherein the aqueous dispersion-type pressure-sensitive adhesive has a viscosity of 0.01 Pa·s to 0.1 Pa·s at a shear rate of 4,000 (1/s), the optical film-forming pressure-sensitive adhesive layer formed on the release film has a surface roughness (Ra) of 10 nm to 40 nm, and the optical film-forming pressure-sensitive adhesive layer has a haze of 1% or less when having a thickness of 23 μm.

In the method for manufacturing an optical film-forming pressure-sensitive adhesive layer, the drying step (2) preferably comprises a first drying step (21) at a temperature of 40° C. to 110° C. and a second drying step (22) at a temperature of 100° C. to 160° C.

In the method for manufacturing an optical film-forming pressure-sensitive adhesive layer, the (meth)acryl-based polymer in the aqueous dispersion-type pressure-sensitive adhesive preferably has a volume average particle diameter of 180 nm or less.

In the method for manufacturing an optical film-forming pressure-sensitive adhesive layer, the applying step (1) is preferably performed at a coating speed of 10 m/minute to 100 m/minute.

In the method for manufacturing an optical film-forming pressure-sensitive adhesive layer, the aqueous dispersion-type pressure-sensitive adhesive is preferably an aqueous dispersion with a solid concentration of 5% by weight to 45% by weight.

In the method for manufacturing an optical film-forming pressure-sensitive adhesive layer, the (meth)acryl-based polymer preferably contains, as monomer units, 60 to 99.9% by weight of an alkyl(meth)acrylate and 0.1 to 10% by weight of a carboxyl group-containing monomer based on the total amount of all monomer units.

In the method for manufacturing an optical film-forming pressure-sensitive adhesive layer, the (meth)acryl-based polymer preferably further contains a phosphate group-containing monomer as a monomer unit. The (meth)acryl-based polymer preferably contains 0.1 to 20% by weight of the phosphate group-containing monomer based on the total amount of all monomer units.

In the method for manufacturing an optical film-forming pressure-sensitive adhesive layer, the (meth)acryl-based polymer preferably further contains an alkoxysilyl group-containing monomer as a monomer unit. The (meth)acryl-based polymer preferably contains 0.001 to 1% by weight of the alkoxysilyl group-containing monomer based on the total amount of all monomer units.

In the method for manufacturing an optical film-forming pressure-sensitive adhesive layer, monomer units of 60 to 99.9% by weight of the alkyl(meth)acrylate preferably consist of 60 to 99.8% by weight of an alkyl acrylate and 0.1 to 39.9% by weight of an alkyl methacrylate. Also, the alkyl acrylate is preferably an alkyl acrylate of 3 to 9 carbon atoms, and the alkyl methacrylate is preferably at least one selected from methyl methacrylate, ethyl methacrylate, and cyclohexyl methacrylate.

The invention also relates to an optical film-forming pressure-sensitive adhesive layer obtained by the method.

The invention also relates to a pressure-sensitive adhesive-type optical film comprising an optical film and the optical film-forming pressure-sensitive adhesive layer placed on at least one side of the optical film.

The invention also relates to an image display device comprising at least one piece of the pressure-sensitive adhesive-type optical film.

Effects of the Invention

The method for manufacturing an optical film-forming pressure-sensitive adhesive layer of the present invention uses an aqueous dispersion-type pressure-sensitive adhesive with a low viscosity (a viscosity of 0.01 to 0.1 Pa·s at a shear rate of 4,000 (1/s)) in the step (1) of applying the aqueous dispersion-type pressure-sensitive adhesive. It is conceivable that according to the present invention, the drying step (2) is performed on a coating film obtained by applying an aqueous dispersion-type pressure-sensitive adhesive with a low viscosity as stated above, so that the drying of the coating film proceeds while the liquid flow of the aqueous dispersion-type pressure-sensitive adhesive occurs uniformly in the coating film, which makes it possible to form a pressure-sensitive adhesive layer having a uniform and smooth surface with a surface roughness (Ra) of 10 to 40 nm without a reduction in productivity, such as a reduction in coating speed. The pressure-sensitive adhesive layer of the present invention obtained in this manner has high surface smoothness, so that the problem with visibility can be reduced.

In the method of the present invention for manufacturing an optical film-forming pressure-sensitive adhesive, the step (1) of applying an aqueous dispersion-type pressure-sensitive adhesive is followed by the drying step (2) to form a pressure-sensitive adhesive layer. In the drying step (2), for example, when the applied aqueous dispersion-type pressure-sensitive adhesive is dried by blowing hot air, a first drying step (21) with the temperature controlled within a predetermined range and a second drying step (22) are preferably used. In the first drying step (21), the coating film obtained by applying the aqueous dispersion-type pressure-sensitive adhesive with a low viscosity is dried at a temperature of 40 to 110° C., so that the drying of the coating film proceeds while the liquid flow of the aqueous dispersion-type pressure-sensitive adhesive occurs uniformly in the coating film. Subsequently, the second drying step (22) is performed to complete the drying. It is conceivable that such a stepwise process for drying the coating film in the drying step (2) is effective in forming a pressure-sensitive adhesive layer having a uniform and smooth surface with a surface roughness (Ra) of 10 to 40 nm without a reduction in productivity, such as a reduction in coating speed.

In a conventional process of forming a pressure-sensitive adhesive layer, a pressure-sensitive adhesive solution such as an organic solvent-type pressure-sensitive adhesive has a low solid concentration (generally about 10 to 15% by weight), so that in the process of drying a coating film by blowing hot air, irregularities can occur due to uneven air flow or nonuniform rate of solvent evaporation from the coating surface, or convection can cause nonuniform rate of solvent evaporation from the coating surface. Therefore, when a pressure-sensitive adhesive layer is formed using an organic solvent-type pressure-sensitive adhesive, a uniform coating surface is not successfully obtained, and the surface smoothness of the pressure-sensitive adhesive layer is easily degraded. In contrast, the aqueous dispersion-type pressure-sensitive adhesive can have a wide range of solid concentrations (5 to 45% by weight) and can be applied at a high solid concentration (35 to 40% by weight). In the manufacturing method of the present invention, the low-viscosity, aqueous dispersion-type, pressure-sensitive adhesive used can have a sufficiently high solid concentration, and in such a case, the content of the medium (water) in the coating film is low, so that uneven air flow or nonuniform rate of solvent evaporation from the coating surface can be reduced and that uneven heat-induced convection can be suppressed, which makes it possible to form a pressure-sensitive adhesive layer with higher surface smoothness.

The process of using an organic solvent-type pressure-sensitive adhesive to form a pressure-sensitive adhesive layer with a smooth surface involves a reduction in productivity, such as a reduction in drying temperature or coating speed. However, using the manufacturing method of the present invention with the aqueous dispersion-type pressure-sensitive adhesive, the surface smoothness of the pressure-sensitive adhesive layer can be improved without a reduction in productivity, such as a reduction in coating speed. The pressure-sensitive adhesive layer of the present invention also has high transparency, can achieve a haze of 1% or less, and does not affect optical properties.

DETAILED DESCRIPTION OF THE PREFERRED EMBODIMENTS

In the manufacturing method of the present invention, an optical film-forming pressure-sensitive adhesive layer is formed using an aqueous dispersion-type pressure-sensitive adhesive. The aqueous dispersion-type pressure-sensitive adhesive material is an aqueous dispersion containing a (meth)acryl-based polymer in the form of an aqueous dispersion. Hereinafter, a (meth)acryl-based polymer in the form of an aqueous dispersion is also simply referred to as a (meth)acryl-based polymer.

The (meth)acryl-based polymer may contain an alkyl (meth)acrylate as a major monomer unit. The term "alkyl (meth)acrylate" refers to alkyl acrylate and/or alkyl methacrylate, and "(meth)" is used in the same meaning in the description.

For example, the (meth)acryl-based polymer in the form of an aqueous dispersion can be obtained by performing emulsion polymerization of monomer components, which include an alkyl(meth)acrylate as a major component, in the presence of a radical polymerization initiator and a surfactant in water.

For example, the monomer components preferably contain 60 to 99.9% by weight of an alkyl(meth)acrylate(s) having a straight or branched chain alkyl group of 4 to 14 carbon atoms and 0.1 to 10% by weight of an carboxyl group-containing monomer(s).

In view of emulsion polymerization reactivity, the alkyl (meth)acrylate used to form the (meth)acryl-based polymer preferably has a water solubility in a specific range, and an alkyl(meth)acrylate having an alkyl group of 1 to 18 carbon atoms is preferably used to form a major component. Examples of the alkyl(meth)acrylate include methyl(meth) acrylate, ethyl(meth)acrylate, propyl(meth)acrylate, n-butyl (meth)acrylate, tert-butyl(meth)acrylate, n-hexyl(meth)acrylate, cyclohexyl(meth)acrylate, 2-ethylhexyl(meth)acrylate, n-octyl(meth)acrylate, lauryl(meth)acrylate, tridecyl(meth) acrylate, stearyl(meth)acrylate, and other alkyl esters of (meth)acrylic acid. These may be used alone or in combination of two or more. Among these, an alkyl(meth)acrylate having an alkyl group of 3 to 9 carbon atoms is preferable, such as propyl(meth)acrylate, n-butyl(meth)acrylate, 2-ethylhexyl(meth)acrylate, or n-octyl(meth)acrylate. The content of the alkyl(meth)acrylate(s) in all monomer units is preferably from 60 to 99.9% by weight, more preferably from 70 to 99.5% by weight, even more preferably from 80 to 99% by weight, still more preferably from 80 to 97% by weight, and yet more preferably from 80 to 95% by weight.

The alkyl(meth)acrylates used to form the (meth)acryl-based polymer preferably include an alkyl acrylate as a major component. Particularly preferred is an alkyl acrylate having an alkyl group of 3 to 9 carbon atoms, such as propyl acrylate, n-butyl acrylate, 2-ethylhexyl acrylate, or n-octyl acrylate. The content of the alkyl acrylate(s) in all monomer units is preferably from 60 to 99.8% by weight, more preferably from 70 to 99.5% by weight, even more preferably from 80 to 99% by weight, still more preferably from 80 to 97% by weight, yet more preferably from 80 to 95% by weight.

In view of improvement of durability, the alkyl(meth)acrylates used to form the (meth)acryl-based polymer preferably include not only an alkyl acrylate(s) but also an alkyl methacrylate(s). In particular, methyl methacrylate, ethyl methacrylate, cyclohexyl methacrylate, etc. are preferable. The content of the alkyl methacrylate(s) in all monomer units is preferably from 0.1 to 39.9% by weight, more preferably from 0.1 to 30% by weight, even more preferably from 1 to 20% by weight, still more preferably from 1 to 15% by weight, and yet more preferably from 1 to 10% by weight.

The (meth)acryl-based polymer may contain a carboxyl group-containing monomer as a copolymerized monomer unit so that it can form a pressure-sensitive adhesive with improved tackiness and a stable aqueous dispersion. The carboxyl group-containing monomer may be monomer having a carboxyl group and a radically-polymerizable unsaturated double bond-containing group such as a (meth)acryloyl group or a vinyl group, examples of which include (meth) acrylic acid, itaconic acid, maleic acid, fumaric acid, crotonic acid, carboxyethyl acrylate, and carboxypentyl acrylate. The content of the carboxyl group-containing monomer in all monomer units of the (meth)acryl-based polymer is preferably from 0.1 to 10% by weight, more preferably from 0.5 to 7% by weight, and even more preferably from 1 to 5% by weight.

In addition to the alkyl(meth)acrylate and the carboxyl group-containing monomer, at least one copolymerizable monomer having an unsaturated double bond-containing polymerizable group such as a (meth)acryloyl group or a vinyl group may be introduced into the (meth)acryl-based polymer by copolymerization in order to stabilize water dispersibility, to improve adhesion to a base material such as an optical film for the pressure-sensitive adhesive layer, and to improve initial tackiness to the adherend.

The copolymerizable monomer may be a phosphate group-containing monomer. The phosphate group-containing monomer is effective in improving adhesion to glass.

For example, the phosphate group-containing monomer may be a phosphate group-containing monomer represented by formula (1) below or a salt thereof.

[Formula (1)]

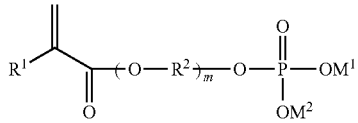

In formula (1), $R^1$ represents a hydrogen atom or a methyl group, $R^2$ represents an alkylene group of 1 to 4 carbon atoms, m represents an integer of 2 or more, and $M^1$ and $M^2$ each independently represent a hydrogen atom or a cation.

In formula (1), m is 2 or more, preferably 4 or more, generally 40 or less, and m represents the degree of polymerization of the oxyalkylene groups. The polyoxyalkylene group may a polyoxyethylene group or a polyoxypropylene group, and these polyoxyalkylene groups may comprise random, block, or graft units. The cation of the salt of the phosphate group is typically, but not limited to, an inorganic cation such as an alkali metal such as sodium or potassium or an alkaline-earth metal such as calcium or magnesium, or an organic cation such as a quaternary amine.

The content of the phosphate group-containing monomer in all monomer units of the (meth)acryl-based polymer is preferably from 0.1 to 20% by weight. If it is less than 0.1% by weight, the effect of using the phosphate group-containing monomer (suppression of the formation of linear bubbles) may be insufficiently obtained, while a content of more than 20% by weight is not preferable in view of polymerization stability or pressure-sensitive adhesive properties.

In addition, the (meth)acryl-based polymer preferably contain an alkoxysilyl group-containing monomer as a copolymerized monomer unit. The alkoxysilyl group-containing monomer may be a silane coupling agent-type unsaturated monomer having an alkoxysilyl group and a group having at least one unsaturated double bond, such as a (meth)acryloyl group or a vinyl group. The alkoxysilyl group-containing monomer is preferable in order to improve affinity for the alkali silicate (B) or to form a bond thereto and to improve adhesion to glass.

Examples of the alkoxysilyl group-containing monomer include an alkoxysilyl group-containing (meth)acrylate monomer and an alkoxysilyl group-containing vinyl monomer. Examples of the alkoxysilyl group-containing (meth)acrylate monomer include (meth)acryloyloxyalkyl-trialkoxysilanes such as (meth)acryloyloxymethyl-trimethoxysilane, (meth)acryloyloxymethyl-triethoxysilane, 2-(meth)acryloyloxyethyl-trimethoxysilane, 2-(meth)acryloyloxyethyl-triethoxysilane, 3-(meth)acryloyloxypropyl-trimethoxysilane, 3-(meth)acryloyloxypropyl-triethoxysilane, 3-(meth)acryloyloxypropyl-tripropoxysilane, 3-(meth)acryloyloxypropyl-triisopropoxysilane, and 3-(meth)acryloyloxypropyl-tributoxysilane; (meth)acryloyloxyalkyl-alkyldialkoxysilanes such as (meth)acryloyloxymethyl-methyldimethoxysilane, (meth)acryloyloxymethyl-methyldiethoxysilane, 2-(meth)acryloyloxyethyl-methyldimethoxysilane, 2-(meth)acryloyloxyethyl-methyldiethoxysilane, 3-(meth)acryloyloxypropyl-methyldimethoxysilane, 3-(meth)acryloyloxypropyl-methyldiethoxysilane, 3-(meth)acryloyloxypropyl-methyldipropoxysilane, 3-(meth)acryloyloxypropyl-methyldiisopropoxysilane, 3-(meth)acryloyloxypropyl-methyldibutoxysilane, 3-(meth)acryloyloxypropyl-ethyldimethoxysilane, 3-(meth)acryloyloxypropyl-ethyldiethoxysilane, 3-(meth)acryloyloxypropyl-ethyldipropoxysilane, 3-(meth)acryloyloxypropyl-ethyldiisopropoxysilane, 3-(meth)acryloyloxypropyl-ethyldibutoxysilane, 3-(meth)acryloyloxypropyl-propyldimethoxysilane, and 3-(meth)acryloyloxypropyl-propyldiethoxysilane; and (meth)acryloyloxyalkyl-dialkyl(mono)alkoxysilanes corresponding to these monomers. For example, alkoxysilyl group-containing vinyl monomers include vinyltrialkoxysilanes such as vinyltrimethoxysilane, vinyltriethoxysilane, vinyltripropoxysilane, vinyltriisopropoxysilane, and vinyltributoxysilane, and vinylalkyldialkoxysilanes and vinyldialkylalkoxysilanes corresponding thereto; vinylalkyltrialkoxysilanes such as vinylmethyltrimethoxysilane, vinylmethyltriethoxysilane, β-vinylethyltrimethoxysilane, β-vinylethyltriethoxysilane, γ-vinylpropyltrimethoxysilane, γ-vinylpropyltriethoxysilane, γ-vinylpropyltripropoxysilane, γ-vinylpropyltriisopropoxysilane, and γ-vinylpropyltributoxysilane, and (vinylalkyl)alkyldialkoxysilanes and (vinylalkyl)dialkyl(mono)alkoxysilanes corresponding thereto.

The content of the alkoxysilyl group-containing monomer in all monomer units of the (meth)acryl-based polymer is preferably from 0.001 to 1% by weight, more preferably from 0.01 to 0.5% by weight, and even more preferably from 0.03 to 0.1% by weight. If it is less than 0.001% by weight, the effect of using the alkoxysilyl group-containing monomer (improvement of durability by improving affinity for the alkali silicate (B) or forming a bond thereto to improve adhesion to glass) may be insufficiently obtained, while if it is more than 1% by weight, the pressure-sensitive adhesive layer may have a too high degree of crosslinkage, so that the pressure-sensitive adhesive layer may crack over time or a problem such as gelation may occur during the production of the (meth)acryl-based polymer.

Examples of copolymerizable monomers other than the alkoxysilyl group-containing monomer and the phosphate group-containing monomer include acid anhydride group-containing monomers such as maleic anhydride and itaconic anhydride; aryl(meth)acrylate such as phenyl(meth)acrylate; vinyl esters such as vinyl acetate and vinyl propionate; styrene monomers such as styrene and α-methylstyrene; epoxy group-containing monomers such as glycidyl(meth)acrylate and methylglycidyl(meth)acrylate; hydroxyl group-containing monomers such as 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 12-hydroxylauryl(meth)acrylate, and (4-hydroxymethylcyclohexyl)-methyl(meth)acrylate; nitrogen atom-containing monomers such as (meth)acrylamide, N,N-dimethyl(meth)acrylamide, N,N-diethyl(meth)acrylamide, N-isopropyl(meth)acrylamide, N-butyl(meth)acrylamide, N-methylol(meth)acrylamide, N-methylolpropane(meth)acrylamide, (meth)acryloylmorpholine, aminoethyl(meth)acrylate, N,N-dimethylaminoethyl(meth)acrylate, and tert-butylaminoethyl(meth)acrylate; alkoxy group-containing monomers such as methoxyethyl(meth)acrylate and ethoxyethyl(meth)acrylate; cyano group-containing monomers such as acrylonitrile and methacrylonitrile; functional monomers such as 2-methacryloyloxyethyl isocyanate; olefin monomers such as ethylene, propylene, isoprene, butadiene, and isobutylene; vinyl ethermonomers such as vinyl ether; halogen atom-containing monomers such as vinyl chloride; and other monomers including vinyl group-containing heterocyclic compounds such as N-vinylpyrrolidone, N-(1-methylvinyl)pyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, and N-vinylmorpholine, and N-vinylcarboxylic acid amides.

Examples of the copolymerizable monomer also include maleimide monomers such as N-cyclohexylmaleimide, N-isopropylmaleimide, N-laurylmaleimide, and N-phenylmaleimide; itaconimide monomers such as N-methylitaconimide, N-ethylitaconimide, N-butylitaconimide, N-octylitaconimide, N-2-ethylhexylitaconimide, N-cyclohexylitaconimide, and N-laurylitaconimide; succinimide monomers such as N-(meth)acryloyloxymethylenesuccinimide, N-(meth)acryloyl-6-oxyhexamethylenesuccinimide, and N-(meth)acryloyl-8-oxyoctamethylenesuccinimide; and sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl(meth)acrylate, and (meth)acryloyloxynaphthalenesulfonic acid.

Examples of the copolymerizable monomer also include glycol acrylate monomers such as polyethylene glycol(meth)acrylate, polypropylene glycol(meth)acrylate, methoxyethylene glycol(meth)acrylate, and methoxypolypropylene glycol(meth)acrylate; and other monomers such as acrylic ester monomers containing a heterocyclic ring or a halogen atom, such as tetrahydrofurfuryl(meth)acrylate and fluoro(meth)acrylate.

A polyfunctional monomer, other than the above alkoxysilyl group-containing monomer, may also be used as the copolymerizable monomer for a purpose such as control of the gel fraction of the aqueous dispersion pressure-sensitive adhesive. The polyfunctional monomer may be a compound having two or more unsaturated double bonds such as those in (meth)acryloyl groups or vinyl groups. Examples that may also be used include (meth)acrylate esters of polyhydric alcohols, such as (mono or poly)alkylene glycol di(meth)acrylates including (mono or poly)ethylene glycol di(meth)acrylates such as ethylene glycol di(meth)acrylate, diethylene glycol di(meth)acrylate, triethylene glycol di(meth)acrylate, trimethylolpropane tri(meth)acrylate, and tetraethylene glycol di(meth)acrylate, (mono or poly)propylene glycol di(meth)acrylate such as propylene glycol di(meth)acrylate, neopentyl glycol di(meth)acrylate, 1,6-hexanediol di(meth)acrylate, pentaerythritol di(meth)acrylate, trimethylolpropane tri(meth)acrylate, pentaerythritol tri(meth)acrylate, and dipentaerythritol hexa(meth)acrylate; polyfunctional vinyl compounds such as divinylbenzene; and compounds having two or more reactive unsaturated double bonds which have different reactivity respectively, such as allyl(meth)acrylate and vinyl(meth)acrylate. The polyfunctional monomer may also be a compound having a polyester, epoxy or urethane skeleton to which two or more unsaturated double bonds are added in the form of functional groups such as (meth)acryloyl groups or vinyl groups in the same manner as the monomer component, such as polyester(meth)acrylate, epoxy(meth)acrylate, or urethane(meth)acrylate.

When a monofunctional monomer is used as the copolymerizable monomer other than the alkoxysilyl group-containing monomer and the phosphate group-containing monomer, the content of the copolymerizable monomer in all monomer units of the (meth)acryl-based polymer is preferably 20% by weight or less, more preferably 10% by weight or less, and even more preferably 5% by weight or less in view of the stability of the aqueous dispersion and prevention of an excessive increase in the viscosity of the aqueous dispersion. When a polyfunctional monomer is used as the copolymerizable monomer, the content of the copolymerizable monomer in all monomer units of the (meth)acryl-based polymer is preferably 5% by weight or less, more preferably 3% by weight or less, and even more preferably 1% by weight or less in view of the stability of the aqueous dispersion.

The (meth)acryl-based polymer can be obtained in the form of an aqueous dispersion containing it, when monomers including the alkyl(meth)acrylate are polymerized in water in the presence of a surfactant and a radical polymerization initiator. The polymerization mode may be emulsion polymerization, suspension polymerization, or dispersion polymerization. The emulsion polymerization, the suspension polymerization, and the dispersion polymerization produce a polymer emulsion, a polymer suspension, and a polymer dispersion, respectively. The type of the pressure-sensitive adhesive polymer and the means for polymerization are selected depending on the type of the pressure-sensitive adhesive. The surfactant, which may be an emulsifying agent in the case of emulsion polymerization or a dispersing agent in the case of suspension polymerization, is appropriately selected depending on each polymerization mode.

The aqueous dispersion containing the acryl-based polymer (A), which is used to form the aqueous dispersion-type pressure-sensitive adhesive according to the present invention, is preferably a polymer emulsion obtained by emulsion polymerization. In other words, the aqueous dispersion-type pressure-sensitive adhesive according to the present invention is preferably an emulsion-type pressure-sensitive adhesive.

The emulsion polymerization of the monomer components may be performed by a conventional method including emulsifying the monomer components in water. This method prepares an aqueous dispersion (polymer emulsion) containing a (meth)acryl-based polymer as a (meth)acryl-based polymer (A). In the emulsion polymerization, for example, the monomer components, a surfactant (an emulsifying agent), and a radical polymerization initiator, and optionally a chain transfer agent or the like are mixed as appropriate. More specifically, for example, a known emulsion polymerization method may be employed, such as a batch mixing method (batch polymerization method), a monomer dropping method, or a monomer emulsion dropping method. In a monomer dropping method or a monomer emulsion dropping method, continuous dropping or divided dropping is appropriately selected. These methods may be appropriately combined. While reaction conditions and so on may be appropriately selected, for example, the polymerization temperature is preferably from about 40 to about 95° C., and the polymerization time is preferably from about 30 minutes to about 24 hours.

The surfactant (emulsifying agent) for use in the emulsion polymerization may be, but not limited to, any of various surfactants commonly used in emulsion polymerization. As the surfactant, an anionic or a nonionic surfactant is generally used. Examples of the anionic surfactant include higher fatty acid salts such as sodium oleate; alkylarylsulfonate salts such as sodium dodecylbenzenesulfonate; alkylsulfate ester salts such as sodium laurylsulfate and ammonium laurylsulfate; polyoxyethylene alkyl ether sulfate ester salts such as sodium polyoxyethylene lauryl ether sulfate; polyoxyethylene alkyl aryl ether sulfate ester salts such as sodium polyoxyethylene nonyl phenyl ether sulfate; alkyl sulfosuccinic acid ester salts such as sodium monooctyl sulfosuccinate, sodium dioctyl sulfosuccinate, and sodium polyoxyethylene lauryl sulfosuccinate, and derivatives thereof; and polyoxyethylene distyrenated phenyl ether sulfate ester salts; sodium naphthalenesulfonate formaldehyde condensates. Examples of the nonionic surfactant include polyoxyethylene alkyl ethers such as polyoxyethylene lauryl ether and polyoxyethylene stearyl ether; polyoxyethylene alkyl phenyl ethers such as polyoxyethylene octyl phenyl ether and polyoxyethylene nonyl phenyl ether; sorbitan higher fatty acid esters such as sorbitan monolaurate, sorbitan monostearate, and sorbitan trioleate; polyoxyethylene sorbitan higher fatty acid esters such as polyoxyethylene sorbitan monolaurate; polyoxyethylene higher fatty acid esters such as polyoxyethylene monolaurate and polyoxyethylenemonostearate; glycerin higher fatty acid esters such as oleic acid monoglyceride and stearic acid monoglyceride; and polyoxyethylene-polyoxypropylene block copolymers, and polyoxyethylene distyrenated phenyl ether.

Besides the above non-reactive surfactants, a reactive surfactant having a radical-polymerizable functional group containing an ethylenic unsaturated double bond may be used as the surfactant. The reactive surfactant may be a radical-polymerizable surfactant prepared by introducing a radical-polymerizable functional group (radically reactive group) such as a propenyl group or an allyl ether group into the anionic surfactant or the nonionic surfactant. These surfactants may be appropriately used alone or in any combination. Among these surfactants, the radical-polymerizable surfactant having a radical-polymerizable functional group is preferably used in view of the stability of the aqueous dispersion or the durability of the pressure-sensitive adhesive layer.

Examples of anionic reactive surfactants include alkyl ether surfactants (examples of commercially available products include AQUALONKH-05, KH-10, and KH-20 manufactured by Dai-ichi Kogyo Seiyaku Co., Ltd., ADEKA REASOAP SR-10N and SR-20N manufactured by ADEKA CORPORATION, LATEMUL PD-104 manufactured by Kao Corporation, and others); sulfosuccinic acid ester surfactants (examples of commercially available products include LATEMUL S-120, S-120A, S-180P, and S-180A manufactured by Kao Corporation and ELEMINOL JS-2 manufactured by Sanyo Chemical Industries, Ltd., and others); alkyl phenyl ether surfactants or alkyl phenyl ester surfactants (examples of commercially available products include AQUALON H-2855A, H-3855B, H-3855C, H-3856, HS-05, HS-10, HS-20, HS-30, BC-05, BC-10, and BC-20 manufactured by Dai-ichi Kogyo Seiyaku Co., Ltd., and ADEKA REASOAP SDX-222, SDX-223, SDX-232, SDX-233, SDX-259, SE-10N, and SE-20N manufactured by ADEKA CORPORATION); (meth)acrylate sulfate ester surfactants (examples of commercially available products include ANTOX MS-60 and MS-2N manufactured by Nippon Nyukazai Co., Ltd., ELEMINOL RS-30 manufactured by Sanyo Chemical Industries Co., Ltd., and others); and phosphoric acid ester surfactants (examples of commercially available products include H-3330PL manufactured by Dai-ichi Kogyo Seiyaku Co., Ltd. ADEKA REASOAP PP-70 manufactured by ADEKA CORPORATION, and others). Examples of nonionic reactive surfactants include alkyl ether surfactants (examples of commercially available products include ADEKA REASOAP ER-10, ER-20, ER-30, and ER-40 manufactured by ADEKA CORPORATION, LATEMUL PD-420, PD-430, and PD-450 manufactured by Kao Corporation, and others); alkyl phenyl ether surfactants or alkyl phenyl ester surfactants (examples of commercially available products include AQUALON RN-10, RN-20, RN-30, and RN-50 manufactured by Dai-ichi Kogyo Seiyaku Co., Ltd., ADEKA REASOAP NE-10, NE-20, NE-30, and NE-40 manufactured by ADEKA CORPORATION, and others); and (meth)acrylate sulfate ester surfactants (examples of commercially available products include RMA-564, RMA-568, and RMA-1114 manufactured by Nippon Nyukazai Co., Ltd, and others).

The content of the surfactant is preferably from 0.3 to 5 parts by weight based on 100 parts by weight of the monomer components including the alkyl(meth)acrylate. Pressure-sensitive adhesive properties, polymerization stability, mechanical stability, etc. can be improved by controlling the content of the surfactant. The surfactant content is more preferably from 0.3 to 4 parts by weight.

The radical polymerization initiator may be, but not limited to, any known radical polymerization initiator commonly used in emulsion polymerization. Examples include azo initiators such as 2,2'-azobisisobutylonitrile, 2,2'-azobis(2-methylpropionamidine)disulfate, 2,2'-azobis(2-methylpropionamidine)dihydrochloride, 2,2'-azobis(2-amidinopropane) dihydrochloride, and 2,2'-azobis[2-(2-imidazoline-2-yl) propane]dihydrochloride; persulfate initiators such as potassium persulfate and ammonium persulfate; peroxide initiators such as benzoyl peroxide, tert-butyl hydroperoxide, and hydrogen peroxide; substituted ethane initiators such as phenyl-substituted ethane; and carbonyl initiators such as aromatic carbonyl compounds. These polymerization initiators may be appropriately used alone or in any combination. If desired, the emulsion polymerization may be performed using a redox system initiator, in which a reducing agent is used in combination with the polymerization initiator. This makes it easy to accelerate the emulsion polymerization rate or to perform the emulsion polymerization at low temperature. Examples of such a reducing agent include reducing organic compounds such as ascorbic acid, erythorbic acid, tartaric acid, citric acid, glucose, and metal salts of formaldehyde sulfoxylate or the like; reducing inorganic compounds such as sodium thiosulfate, sodium sulfite, sodium bisulfite, and sodium metabisulfite; and ferrous chloride, Rongalite, and thiourea dioxide.

The content of the radical polymerization initiator is typically from about 0.02 to about 1 part by weight, preferably from 0.02 to 0.5 parts by weight, more preferably from 0.08 to 0.3 parts by weight, based on 100 parts by weight of the monomer components, while it is appropriately selected. If it is less than 0.02 parts by weight, the radical polymerization initiator may be less effective. If it is more than 1 part by weight, the (meth)acryl-based polymer in the aqueous dispersion (polymer emulsion) may have a reduced molecular weight, so that the aqueous dispersion pressure-sensitive adhesive may have reduced durability. In the case of a redox system initiator, the reducing agent is preferably used in an amount of 0.01 to 1 part by weight based on 100 parts by weight of the total amount of the monomer components.

A chain transfer agent is optionally used to control the molecular weight of the (meth)acryl-based polymer. In general, chain transfer agents commonly used in emulsion polymerization are used. Examples include 1-dodecanthiol, mercaptoacetic acid, 2-mercaptoethanol, 2-ethylhexyl thioglycolate, 2,3-dimercapto-1-propanol, mercaptopropionic acid esters, and other mercaptans. These chain transfer agents may be appropriately used alone or in any combination. For example, the content of the chain transfer agent is from 0.001 to 0.3 parts by weight based on 100 parts by weight of the monomer components.

Using such emulsion polymerization, the (meth)acryl-based polymer can be prepared in the form of an aqueous dispersion (emulsion). Such a (meth)acryl-based polymer preferably has a volume average particle diameter of 180 nm or less, more preferably 10 nm to 180 nm, and even more preferably 10 nm to 150 nm. When the aqueous dispersion-type pressure-sensitive adhesive is used in optical applications, the volume average particle diameter of the (meth) acryl-based polymer is preferably as small as possible. When the particle diameter is smaller than the visible-light range, the particles do not cause scattering of polarized light, etc., so that optical properties are not degraded. The diameters of particles producible by emulsion polymerization generally have a lower limit of about 10 nm.

For maintaining the stability of the aqueous dispersion, the carboxyl group-containing monomer or the like, which is included in the (meth)acryl-based polymer as a monomer unit, should preferably be neutralized. For example, the neutralization can be performed using ammonia, an alkali metal hydroxide, or the like.

In general, the (meth)acryl-based polymer according to the invention preferably has a weight average molecular weight of 1,000,000 or more. In particular, the weight average molecular weight is preferably from 1,000,000 to 4,000,000 in view of heat resistance or moisture resistance. A weight average molecular weight of less than 1,000,000 is not preferred, because with such a molecular weight, heat resistance or moisture resistance may decrease. The pressure-sensitive adhesive obtained by the emulsion polymerization is preferred because the polymerization mechanism can produce very high molecular weight. It should be noted, however, that the pressure-sensitive adhesive obtained by the emulsion polymerization generally has a high gel content and cannot be subjected to GPC (gel permeation chromatography) measurement, which means that it is often difficult to identify the molecular weight by actual measurement.

The aqueous dispersion-type pressure-sensitive adhesive according to the present invention, which contains the components described above, is preferably used in such a manner that the total weight of the solids in these components is 80% by weight or more, more preferably 90% by weight or more, even more preferably 95% by weight or more, still more preferably 100% of the weight of the solids in the aqueous dispersion for the aqueous dispersion-type pressure-sensitive adhesive. Besides the above components, therefore, an additional component may be used in the aqueous dispersion for the aqueous dispersion-type pressure-sensitive adhesive. Such an additional component is preferably used at a content of 10% by weight or less in order to suppress an adverse change in the haze of the pressure-sensitive adhesive layer.

If necessary, a crosslinking agent may also be added as the additional component. Although a crosslinking agent can provide a cohesive force for the pressure-sensitive adhesive layer, the use of a crosslinking agent tends to degrade adhesion and to generate moisture-induced peeling. In the present invention, therefore, a crosslinking agent is not particularly necessary.

If necessary, the aqueous dispersion pressure-sensitive adhesive of the invention may further appropriately contain any of various additives such as viscosity adjusting agent, releasing adjusting agent, tackifiers, silane coupling agents, plasticizers, softener, fillers including glass fibers, glass beads, metal power, or any other inorganic powder, pigments, colorants (pigments, dyes or the likes), pH adjusting agent (acid or base), antioxidants, and ultraviolet ray absorbing agents, without departing from the objects of the invention. The aqueous dispersion pressure-sensitive adhesive may also contain fine particles to form a light-diffusing pressure-sensitive adhesive layer. These additives may also be added in the form of dispersion.

In the manufacturing method of the present invention, the applying step (1) is performed using an aqueous dispersion-type pressure-sensitive adhesive having a controlled viscosity of 0.01 Pa·s to 0.1 Pa·s at a shear rate of 4,000 (l/s). The viscosity is preferably from 0.02 Pa·s to 0.08 Pa·s. If the viscosity is less than 0.01 Pa·s, significant liquid flow can occur in the drying step, so that smoothness can be reduced. If the viscosity is more than 0.1 Pa·s, streaks will be more likely to occur during coating, which makes it difficult to obtain a pressure-sensitive adhesive layer with a good coating appearance.

While the preparation of the aqueous dispersion-type pressure-sensitive adhesive is controlled so that the viscosity of the aqueous dispersion-type pressure-sensitive adhesive falls within the above range, the shear rate applied to the aqueous dispersion-type pressure-sensitive adhesive is not limited to 4,000 (l/s) in the preparation step. In the preparation step, the shear rate to be applied to the aqueous dispersion-type pressure-sensitive adhesive may be determined depending on the coating speed in the applying step (1), for example, to fall within the range of 1,000 to 10,000 (l/s), preferably within the range of 2,000 to 10,000 (l/s), and more preferably within the range of 4,000 to 10,000 (l/s).

The solid concentration of the aqueous dispersion-type pressure-sensitive adhesive according to the present invention is preferably, but not limited to, 5 to 45% by weight. The solid concentration is preferably 25% by weight or more in view of drying rate or liquid flow in the coating film. The solid concentration is preferably from 25 to 45% by weight, and more preferably from 30 to 45% by weight.

The optical film-forming pressure-sensitive adhesive layer according to the present invention is manufactured by performing the step (1) of applying the aqueous dispersion-type pressure-sensitive adhesive to a release film and then performing the step (2) of drying the aqueous dispersion-type pressure-sensitive adhesive applied in the step (1).

Examples of the material used to form the release film include a plastic film such as a polyethylene, polypropylene, polyethylene terephthalate, or polyester film, a porous material such as paper, fabric, or nonwoven fabric, and an appropriate thin material such as a net, a foamed sheet, a metal foil, and a laminate thereof. A plastic film is preferably used, because of its good surface smoothness.

Any plastic film capable of protecting the pressure-sensitive adhesive layer may be used, examples of which include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the release film is generally from about 5 to about 200 μm, preferably from about 5 to about 100 μm. If necessary, the separator may be subjected to a release treatment and an antifouling treatment with a silicone, fluoride, long-chain alkyl, or fatty acid amide release agent, silica powder or the like, or subjected to an antistatic treatment of coating type, kneading and mixing type, vapor-deposition type, or the like. In particular, when the surface of the release film is appropriately subjected to a release treatment such as a silicone treatment, a long-chain alkyl treatment, or a fluorine treatment, the releasability from the pressure-sensitive adhesive layer can be further increased.

Various methods may be used in the applying step (1). Examples include roll coating, kiss roll coating, gravure coating, reverse coating, roll brush coating, spray coating, dip roll coating, bar coating, knife coating, air knife coating, curtain coating, lip coating, and extrusion coating using a die coater or the like.

In the applying step (1), the amount of the application should be controlled so that a pressure-sensitive adhesive layer with a predetermined thickness (post-drying thickness) can be formed. Due to liquid flow in the coating film, as the thickness of the coating layer decreases, it becomes easier to obtain a uniform and smooth surface, and therefore, the thickness (post-drying thickness) of the pressure-sensitive adhesive layer is generally set within the range of 5 µm to 30 µm, preferably within the range of 10 µm to 30 µm, and more preferably within the range of 20 µm to 30 µm.

Subsequently, the drying step (2) is performed on the aqueous dispersion-type pressure-sensitive adhesive applied in the applying step (1). Generally, in the drying step (2), the temperature is preferably from about 40° C. to about 160° C., and the drying time period is preferably from 30 seconds to 5 minutes. When the drying step (2) is performed at a single stage, the drying is preferably performed at a temperature of 60° C. to 160° C., more preferably at a temperature of 70° C. to 150° C., and even more preferably at a temperature of 80° C. to 140° C., and the drying time period is preferably from 30 seconds to 5 minutes, and more preferably from 60 seconds to 2 minutes.

The drying step (2) preferably includes a first drying step (21) and a second drying step (22). In the first drying step (21), the drying temperature is preferably from 40° C. to 110° C., more preferably from 50° C. to 100° C., and even more preferably from 55° C. to 100° C. Setting the drying temperature at 40° C. or more in the first drying step (21) is preferable in order to ensure a sufficient drying rate and increase the coating speed. On the other hand, setting the drying temperature at 110° C. or less in the first drying step (21) is preferred in order to allow uniform liquid flow in the coating film and to obtain a pressure-sensitive adhesive layer with a uniform and smooth surface. Generally, in the first drying step (21), the drying time period is preferably from 30 seconds to 2 minutes, more preferably from 30 seconds to 1 minute. The air velocity that may be used in the first drying step (21) is generally, but not limited to, in the range of 5 m/s to 15 m/s.

The first drying step (21) is followed by the second drying step (22). In the second drying step (22), the drying temperature is preferably from 100° C. to 160° C., more preferably from 110° C. to 160° C., and even more preferably from 130° C. to 150° C. Setting the drying temperature at 100° C. or more in the second drying step (22) is preferable in order to ensure a sufficient drying rate and increase the coating speed. On the other hand, setting the drying temperature at 160° C. or less in the second drying step (22) is preferable in order to prevent excessive drying so that a pressure-sensitive adhesive layer with a uniform and smooth surface can be obtained. Generally, in the second drying step (22), the drying time period is preferably from 30 seconds to 2 minutes, and more preferably from 30 seconds to 1 minute. The air velocity that may be used in the second drying step (22) is generally, but not limited to, in the range of 10 m/s to 20 m/s.

In order to form a highly smooth pressure-sensitive adhesive layer, the drying temperature in the second drying step (22) is preferably set higher than that in the first drying step (21). In this point of view, the drying temperature in the second drying step (22) is preferably 10° C. to 100° C. higher, more preferably 20° C. to 80° C. higher, even more preferably 30° C. to 50° C. higher than that in the first drying step (21). In each of the first and second drying steps (21) and (22), two or more different sub-steps may be performed using different drying temperatures.

The applying step (1) and the drying step (2) are generally provided to perform a continuous process, and in the method for manufacturing an optical film-forming pressure-sensitive adhesive layer of the present invention, the coating speed in the applying step (1) is preferably from 10 m/minute to 250 m/minute in view of productivity and production of a pressure-sensitive adhesive layer with a uniform and smooth surface. The coating speed is more preferably 150 m/minute or less, and even more preferably 100 m/minute or less. A coating speed of more than 250 m/minute is not preferable in view of obtaining a pressure-sensitive adhesive layer with a smooth surface.

In the present invention, the optical film-forming pressure-sensitive adhesive layer is formed on a release film. The pressure-sensitive adhesive layer formed on the release film has a surface roughness (Ra) of 10 nm to 40 nm, so that the surface of the pressure-sensitive adhesive is smooth and uniform. The pressure-sensitive adhesive layer preferably has a surface roughness (Ra) of 10 nm to 30 nm, and more preferably 10 nm to 20 nm.

In the present invention, the optical film-forming pressure-sensitive adhesive layer preferably has a haze of 1% or less when having a thickness of 23 µm, which can satisfy the transparency required of optical film-forming pressure-sensitive adhesive layers. The haze is preferably from 0 to 0.8%, and more preferably from 0 to 0.5%. A haze of 1% or less is satisfactory for optical applications. If the haze is more than 1%, white turbidity can occur, which is not preferable for optical film applications.

The pressure-sensitive adhesive layer formed on the release film may be transferred to an optical film by bonding the surface of the pressure-sensitive adhesive layer to the optical film, so that a pressure-sensitive adhesive-type optical film can be obtained. The pressure-sensitive adhesive layer may be exposed. In such a case, the pressure-sensitive adhesive layer may be protected by the release film until it is actually used. The release film may be used as is as a separator for a pressure-sensitive adhesive-type optical film, so that the process can be simplified.

An optical film may also be coated with an anchor layer or subjected to any adhesion-facilitating treatment such as a corona treatment or a plasma treatment so as to have improved adhesion to a pressure-sensitive adhesive layer, and then the pressure-sensitive adhesive layer may be formed. The surface of the pressure-sensitive adhesive layer may also be subjected to an adhesion-facilitating treatment.

Materials that may be used to form the anchor layer preferably include an anchoring agent selected from polyurethane, polyester, polymers containing an amino group in the molecule, and polymers containing an oxazolinyl group in the molecule, in particular, preferably polymers containing an amino group in the molecule and polymers containing an oxazolinyl group in the molecule. Polymers containing an amino group in the molecule and polymers containing an oxazolinyl group in the molecule allow the amino group in the molecule or an oxazolinyl group in the molecule to react with a carboxyl group or the like in the pressure-sensitive adhesive or to make an interaction such as an ionic interaction, so that good adhesion can be ensured.

Examples of polymers containing an amino group in the molecule include polyethyleneimine, polyallylamine, polyvinylamine, polyvinylpyridine, polyvinylpyrrolidine, and a polymer of an amino group-containing monomer such as dimethylaminoethyl acrylate.

The optical film is, but not limited to the kinds, used for forming image display device such as liquid crystal display. A polarizing plate is exemplified. A polarizing plate including a polarizer and a transparent protective film provided on one side or both sides of the polarizer is generally used.

A polarizer is, but not limited to, various kinds of polarizer may be used. As a polarizer, for example, a film that is uniaxially stretched after having dichromatic substances, such as iodine and dichromatic dye, absorbed to hydrophilic polymer films, such as polyvinyl alcohol-based film, partially formalized polyvinyl alcohol-based film, and ethylene-vinyl acetate copolymer-based partially saponified film; polyene-based alignment films, such as dehydrated polyvinyl alcohol and dehydrochlorinated polyvinyl chloride, etc. may be mentioned. In these, a polyvinyl alcohol-based film on which dichromatic materials such as iodine, is absorbed and aligned after stretched is suitably used. Thickness of polarizer is, but not limited to, generally about 5 to about 80 μm.

A polarizer that is uniaxially stretched after a polyvinyl alcohol-based film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol-based film may be dipped in water and rinsed if needed. By rinsing polyvinyl alcohol-based film with water, effect of preventing un-uniformity, such as unevenness of dyeing, is expected by making polyvinyl alcohol-based film swelled in addition that also soils and blocking inhibitors on the polyvinyl alcohol-based film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

An optical film may be exemplified as other optical layers, such as a reflective plate, a transflective plate, a retardation plate (a half wavelength plate and a quarter wavelength plate included), a viewing angle compensation film, a brightness enhancement film, a surface treatment film or the like, which may be used for formation of a liquid crystal display etc. These are used in practice as an optical film, or as one layer or two layers or more of optical layers laminated with polarizing plate.

The surface treatment film may also be provided on and bonded to a front face plate. Examples of the surface treatment film include a hard-coat film for use in imparting scratch resistance to the surface, an antiglare treatment film for preventing glare on image display devices, and an anti-reflection film such as an anti-reflective film or a low-reflective film, etc. The front face plate is provided on and bonded to the surface of an image display device such as a liquid crystal display device, an organic EL display device, a CRT, or a PDP to protect the image display device or to provide a high-grade appearance or a differentiated design. The front face plate is also used as a support for a λ/4 plate in a 3D-TV. In a liquid crystal display device, for example, the front face plate is provided above a polarizing plate on the viewer side. When the pressure-sensitive adhesive layer according to the present invention is used, the same effect can be produced using a plastic base material such as a polycarbonate or poly(methyl methacrylate) base material for the front face plate, as well as using a glass base material.

Although an optical film with the above described optical layer laminated to the polarizing plate may be formed by a method in which laminating is separately carried out sequentially in manufacturing process of a liquid crystal display device or the like, an optical film in a form of being laminated beforehand has an outstanding advantage that it has excellent stability in quality and assembly workability, and thus manufacturing processes ability of a liquid crystal display device or the like may be raised. Proper adhesion means, such as a pressure-sensitive adhesive layer, may be used for laminating. On the occasion of adhesion of the above described polarizing plate and other optical films, the optical axis may be set as a suitable configuration angle according to the target retardation characteristics or the like.

The pressure-sensitive adhesive-type optical film of the invention is preferably used to form various types of image display devices such as liquid crystal display devices. Liquid crystal display devices may be produced according to conventional techniques. Specifically, liquid crystal display devices are generally produced by appropriately assembling a display panel such as a liquid crystal cell and the pressure-sensitive adhesive-type optical film and optionally other components such as a lighting system and incorporating a driving circuit according to any conventional technique, except that the pressure-sensitive adhesive-type optical film of the invention is used. Any type of liquid crystal cell may also be used such as a TN type, an STN type, a n type, a VA type and an IPS type.

Suitable liquid crystal display devices, such as liquid crystal display device with which the above pressure-sensitive adhesive-type optical film has been provided on one side or both sides of the display panel such as a liquid crystal cell, and with which a backlight or a reflective plate is used for a lighting system may be manufactured. In this case, the pressure-sensitive adhesive-type optical film of the present invention may be provided on one side or both sides of the display panel such as a liquid crystal cell. When providing the pressure-sensitive adhesive-type optical films on both sides, they may be of the same type or of different type. Furthermore, in assembling a liquid crystal display device, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display device: OLED) will be explained. Generally, in organic EL display device, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display device emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong nonlinear relationship between electric current and luminescence strength accompanied by rectification nature to applied voltage.

In an organic EL display device, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display device of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display device looks like mirror if viewed from outside.

In an organic EL display device containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarization plate, while preparing the polarization plate on the surface side of the transparent electrode.

Since the retardation plate and the polarization plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarization plate and the retardation plate is adjusted to $\pi/4$, the mirror surface of the metal electrode may be completely covered.

This means that only linearly polarized light component of the external light that enters as incident light into this organic EL display device is transmitted with the work of polarization plate. This linearly polarized light generally gives an elliptically polarized light by the retardation plate, and especially the retardation plate is a quarter wavelength plate, and moreover when the angle between the two polarization directions of the polarization plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarization plate, it cannot be transmitted through the polarization plate. As the result, mirror surface of the metal electrode may be completely covered.

As described above, in order to block mirror reflection, the organic EL panel of an organic EL display device may use an elliptically or circularly polarizing plate having a combination of a retardation plate and a polarizing plate with the pressure-sensitive adhesive layer interposed therebetween. Alternatively, without an elliptically or circularly polarizing plate directly bonded to an organic EL panel, a laminate formed by bonding an elliptically or circularly polarizing plate to a touch panel with the pressure-sensitive adhesive layer interposed therebetween may be used in an organic EL panel.

The present invention is applicable to various types of touch panel, such as optical, ultrasonic, capacitance, and resistive touch panels. A resistive touch panel includes: a touch-side, touch panel-forming electrode plate having a transparent conductive thin film; and a display-side, touch panel-forming electrode plate having a transparent conductive thin film, wherein the electrode plates are opposed to each other with spacers interposed therebetween in such a manner that the transparent conductive thin films are opposed to each other. A capacitance touch panel generally includes a transparent conductive film that has a transparent conductive thin film in a specific pattern and is formed over the surface of a display unit. The pressure-sensitive adhesive-type optical film according to the present invention may be used on any of the touch side and the display side.

EXAMPLES

Hereinafter, the present invention is more specifically described with reference to the examples, which however are not intended to limit the present invention. In each example, "parts" and "%" are all by weight.

<Measurement of Viscosity>

The viscosity (Pa·s) of the aqueous dispersion-type pressure-sensitive adhesive was measured under the following conditions using Rheowin manufactured by HAAKE.

Cone: 35 mm in diameter
Measurement temperature: 30° C.
Shear conditions: Measurement for 20 seconds between 0.1 and 14,000 (1/s). Approximate values were calculated from the resulting data, and the value at a shear rate of 4,000 (1/s) was used to indicate the viscosity.

<Measurement of Volume Average Particle Diameter>

An aqueous dispersion containing the (meth)acryl-based polymer, which was prepared in the form of an aqueous dispersion, was diluted with distilled water to a solid concentration of about 1% by weight, and the volume average particle diameter of the (meth)acryl-based polymer was measured by the system below using the dilution.

System: LS13 320 (PIDS mode) manufactured by Beckman Coulter, Inc.
Refractive index of dispersoid: 1.48 (using poly(n-butyl acrylate))
Refractive index of dispersion medium: 1.333

Example 1

Preparation of Monomer Emulsion

To a vessel were added 880 parts of butyl acrylate, 50 parts of acrylic acid, 50 parts of cyclohexyl methacrylate, 20 parts of mono[poly(propylene oxide) methacrylate]phosphate ester (5.0 in average degree of polymerization of propylene oxide), and 0.3 parts of 3-methacryloyloxypropyl-triethoxysilane (KBM-503, manufactured by Shin-Etsu Chemical Co., Ltd.) as raw material monomers and mixed to form a monomer component. Subsequently, 4 parts of AQUALON HS-10 (manufactured by Dai-ichi Kogyo Seiyaku Co., Ltd.) as a reactive emulsifying agent and 268 parts of ion-exchanged water were added to 400 parts of the prepared monomer component, and forcedly emulsified by stirring at 6,000 rpm for 5 minutes using a homomixer, so that a monomer emulsion was obtained.

(Preparation of Aqueous Dispersion-Type Acryl-Based Pressure-Sensitive Adhesive)

Subsequently, 136 parts of the monomer emulsion prepared as described above, 8 parts of AQUALON HS-10 (manufactured by Dai-ichi Kogyo Seiyaku Co., Ltd.) as a reactive emulsifying agent, and 308 parts of ion-exchanged water were added to a reaction vessel equipped with a condenser tube, a nitrogen-introducing tube, a thermometer, a dropping funnel, and a stirring blade. Subsequently, after the space in the reaction vessel was sufficiently replaced with nitrogen gas, 0.1 parts of ammonium persulfate was added to the vessel, and the mixture was subjected to polymerization at 65° C. for 1 hour. Subsequently, 0.3 parts of ammonium persulfate was added, and 536 parts of the remaining part of the monomer emulsion was added dropwise to the reaction vessel over 3 hours and then subjected to polymerization for 3 hours. Subsequently, while replacement with nitrogen gas was performed, polymerization was further carried out at 75° C. for 3 hours, so that an aqueous dispersion (emulsion) with a solid concentration of 40% containing a (meth)acryl-based polymer in the form of an aqueous dispersion was obtained. Subsequently, after the aqueous dispersion was cooled to room temperature, the pH of the dispersion was adjusted to 8 by adding 10% ammonia water thereto, so that an aqueous dispersion-type acryl-based pressure-sensitive adhesive was obtained (38% in solid concentration). The aqueous dispersion-type acryl-based pressure-sensitive adhesive had a viscosity of 0.066 Pa·s and a volume average particle diameter of 88 nm.

(Formation of Pressure-Sensitive Adhesive Layer and Preparation of Pressure-Sensitive Adhesive-Type Polarizing Plate)

The aqueous dispersion-type acryl-based pressure-sensitive adhesive was applied to a release film (Diafoil MRF-38, manufactured by Mitsubishi Chemical Polyester Co., Ltd., a polyethylene terephthalate backing) with a lip coater at a coating speed of 20 m/minute so that a 23 μm thick coating could be formed after drying, and then the coating was subjected to a first drying step at a drying temperature of 100° C. for 1 minute with a hot air circulation oven (10 m/second in air velocity) and to a second drying step at a drying temperature of 130° C. for 1 minute with a hot air circulation oven (20 m/second in air velocity), so that a pressure-sensitive adhesive layer was formed. The pressure-sensitive adhesive layer was bonded to a polarizing plate (VEGQ (product name) manufactured by NITTO DENKO CORPORATION) to form two types of pressure-sensitive adhesive-type polarizing plate.

Example 2

A pressure-sensitive adhesive layer was formed as in Example 1, except that the coating speed was changed to 50 m/minute in the formation of the pressure-sensitive adhesive layer and the preparation of the pressure-sensitive adhesive-type polarizing plate. A pressure-sensitive adhesive-type polarizing plate was also prepared as in Example 1.

Example 3

A pressure-sensitive adhesive layer was formed as in Example 1, except that the drying temperature of the first drying step was changed to 80° C. in the formation of the pressure-sensitive adhesive layer and the preparation of the pressure-sensitive adhesive-type polarizing plate. A pressure-sensitive adhesive-type polarizing plate was also prepared as in Example 1.

Example 4

A pressure-sensitive adhesive layer was formed as in Example 1, except that the drying temperature of the first drying step was changed to 60° C. and the coating speed was changed to 25 m/minute in the formation of the pressure-sensitive adhesive layer and the preparation of the pressure-sensitive adhesive-type polarizing plate. A pressure-sensitive adhesive-type polarizing plate was also prepared as in Example 1.

Example 5

An aqueous dispersion-type acryl-based pressure-sensitive adhesive (38% in solid concentration) was obtained as in Example 1, except that the pH was adjusted to 7 by adding 10% ammonia water in the preparation of the aqueous dispersion-type acryl-based pressure-sensitive adhesive. The aqueous dispersion-type acryl-based pressure-sensitive adhesive had a viscosity of 0.044 Pa·s and a volume average particle diameter of 86 nm. A pressure-sensitive adhesive layer was also formed as in Example 1, except that the resulting aqueous dispersion-type acryl-based pressure-sensitive adhesive was used. A pressure-sensitive adhesive-type polarizing plate was also prepared as in Example 1.

Example 6

An aqueous dispersion-type acryl-based pressure-sensitive adhesive was obtained as in Example 1, except that the added amount of acrylic acid was changed from 50 parts to 10 parts in the preparation of the monomer emulsion and that the solid concentration of the resulting aqueous dispersion-type acryl-based pressure-sensitive adhesive was controlled to 50% in the preparation of the aqueous dispersion-type acryl-based pressure-sensitive adhesive. The aqueous dispersion-type acryl-based pressure-sensitive adhesive had a viscosity of 0.070 Pa·s and a volume average particle diameter of 130 nm. A pressure-sensitive adhesive layer was also formed as in Example 1, except that the resulting aqueous dispersion-type acryl-based pressure-sensitive adhesive was used. A pressure-sensitive adhesive-type polarizing plate was also prepared as in Example 1.

Example 7

An aqueous dispersion-type acryl-based pressure-sensitive adhesive (38% in solid concentration) was obtained as in Example 1, except that the pH was adjusted to 6.8 by adding 10% ammonia water in the preparation of the aqueous dispersion-type acryl-based pressure-sensitive adhesive. The aqueous dispersion-type acryl-based pressure-sensitive adhesive had a viscosity of 0.020 Pa·s and a volume average particle diameter of 88 nm. A pressure-sensitive adhesive layer was also formed as in Example 1, except that the resulting aqueous dispersion-type acryl-based pressure-sensitive adhesive was used. A pressure-sensitive adhesive-type polarizing plate was also prepared as in Example 1.

Comparative Example 1

Preparation of Monomer Emulsion

To a vessel were added 80 parts of 2-ethylhexyl acrylate, 20 parts of methyl methacrylate, 0.1 parts of dodecyl mercaptan, 0.1 parts of N-methylolacrylamide, and 2 parts of acrylic acid as raw material monomers, and 1.5 parts of sodium polyoxyethylene alkyl phenyl ether sulfate (LEVENOL WZ (trade name) manufactured by Kao Corporation) and 27 parts of water, so that a monomer emulsion was obtained.

(Preparation of Aqueous Dispersion-Type Acryl-Based Pressure-Sensitive Adhesive)

Subsequently, 33 parts of water was added to a reaction vessel equipped with a reflux condenser, a thermometer, and a stirrer. After the space in the reaction vessel was replaced with nitrogen gas, the temperature was raised to 80° C., and 0.5 parts of ammonium persulfate and then 0.2% of the total weight of the monomer emulsion were added to start polymerization. After the start of polymerization was checked, the remaining part (99.8% of the total weight) of the monomer emulsion was continuously added dropwise over 4 hours at 79-81° C. After the continuous dropwise addition of the monomer emulsion was completed, 1.0 part of an aqueous solution of 10% by weight ammonium persulfate was added, and the mixture was further kept at 80° C. for 2 hours, so that the reaction was completed. The resulting acryl-based copolymer emulsion was neutralized with 25% by weight ammonia water, and an acryl-based thickener (B-300 manufactured by TOAGOSEI CO., LTD.) was added thereto, so that an aqueous dispersion-type acryl-based pressure-sensitive adhesive was obtained. The aqueous dispersion-type acryl-based pressure-sensitive adhesive had a viscosity of 0.150 Pa·s and a volume average particle diameter of 1,020 nm.

(Formation of Pressure-Sensitive Adhesive Layer and Preparation of Pressure-Sensitive Adhesive-Type Polarizing Plate)

A pressure-sensitive adhesive layer was formed as in Example 1, except that the resulting aqueous dispersion-type acryl-based pressure-sensitive adhesive was used for aqueous dispersion-type acryl-based pressure-sensitive adhesive. A pressure-sensitive adhesive-type polarizing plate was also prepared as in Example 1.

Comparative Example 2

Preparation of Solvent-Type Acryl-Based Pressure-Sensitive Adhesive

To a reaction vessel equipped with a condenser tube, a nitrogen gas introducing tube, a thermometer, and a stirrer were added 96.5 parts of butyl acrylate, 3 parts of acrylic acid, 0.5 parts of 2-hydroxyethyl acrylate, 0.15 parts of 2,2'-azobisisobutyronitrile, and 100 parts of ethyl acetate. After sufficient replacement with nitrogen gas, the mixture was allowed to react at 60° C. for 8 hours with stirring under a nitrogen gas stream, so that a solution of an acryl-based polymer with an average molecular weight of 1,650,000 was obtained. Based on 100 parts of the solids of the acryl-based polymer solution, 0.5 parts of an isocyanate crosslinking agent (CORONATE L, manufactured by NIPPON POLYURETHANE INDUSTRY CO., LTD.) was added to the acryl-based polymer solution, so that a solvent-type acryl-based pressure-sensitive adhesive with a solid concentration of 12% was obtained. The solvent-type acryl-based pressure-sensitive adhesive had a viscosity of 0.21 Pa·s.

(Formation of Pressure-Sensitive Adhesive Layer and Preparation of Pressure-Sensitive Adhesive-Type Polarizing Plate)

A pressure-sensitive adhesive layer was formed as in Example 1, except that the solvent-type acryl-based pressure-sensitive adhesive was used in place of the aqueous dispersion-type acryl-based pressure-sensitive adhesive. A pressure-sensitive adhesive-type polarizing plate was also prepared as in Example 1.

Comparative Example 3

A pressure-sensitive adhesive layer was formed as in Comparative Example 2, except that the coating speed was changed to 10 m/minute in the formation of the pressure-sensitive adhesive layer and the preparation of the pressure-sensitive adhesive-type polarizing plate. A pressure-sensitive adhesive-type polarizing plate was also prepared as in Example 1.

Comparative Example 4

An aqueous dispersion-type acryl-based pressure-sensitive adhesive was obtained as in Example 1, except that the solid concentration of the resulting aqueous dispersion-type acryl-based pressure-sensitive adhesive was controlled to 20% in the preparation of the aqueous dispersion-type acryl-based pressure-sensitive adhesive and that based on 100 parts of the solids of the aqueous dispersion-type acryl-based pressure-sensitive adhesive, 2 parts by weight of a urethane associative thickener (ADEKANOL UH541 manufactured by ADEKA CORPORATION) was added to the acryl-based pressure-sensitive adhesive. The aqueous dispersion-type acryl-based pressure-sensitive adhesive had a viscosity of 0.23 Pa·s and a volume average particle diameter of 92 nm. A pressure-sensitive adhesive layer was also formed as in Example 1, except that the resulting aqueous dispersion-type acryl-based pressure-sensitive adhesive was used. A pressure-sensitive adhesive-type polarizing plate was also prepared as in Example 1.

The pressure-sensitive adhesive layers and the pressure-sensitive adhesive-type polarizing plates obtained in the examples and the comparative examples were evaluated as described below. The evaluation results are shown in Table 1.

<Haze>

The 23 μm thick pressure-sensitive adhesive layer obtained in each example, which was provided on the release film, was bonded to a slide glass plate (Micro Slide Glass, manufactured by Matsunami Glass Ind., Ltd., 1.3 mm in thickness) and measured for haze by a haze meter (Model HM-150, manufactured by Murakami Color Research Laboratory). When the haze was measured, the release film was peeled off.

<Surface Smoothness of Pressure-Sensitive Adhesive Layer>

The surface of the pressure-sensitive adhesive layer was measured for surface roughness Ra (irregularities) (in units of nm) in a 60 mmϕ visual field by Fuji scanning method using a laser interferometer F601 manufactured by Fuji Photo Optical Co., Ltd. The measurement was performed on the surface of the 23 μm thick pressure-sensitive adhesive layer (after drying) formed on the release film (Diafoil MRF-38, manufactured by Mitsubishi Chemical Polyester Co., Ltd., a polyethylene terephthalate backing). This is because if the release film is peeled off before the measurement, the surface of the pressure-sensitive adhesive layer can be disturbed during the peeling, so that the smoothness can be affected. The release film, on which the pressure-sensitive adhesive layer was formed, had a surface roughness Ra of 6 nm.

<Visibility>

The release film was peeled off from the resulting pressure-sensitive adhesive-type polarizing plate, and a sample was formed by bonding the pressure-sensitive adhesive layer to a glass substrate. The sample was visually observed for visibility under a fluorescent lamp in two directions (the normal direction and a 45° oblique direction) according to the following criteria.

○: There is no unevenness affecting visibility.
Δ: There is recognizable unevenness to some extent.
x: There is a problem with visibility.

(2) drying the applied aqueous dispersion-type pressure-sensitive adhesive thereby forming the optical film forming pressure-sensitive adhesive layer formed on the release film, wherein the optical film-forming pressure-sensitive adhesive layer has a surface roughness (Ra) of 10 nm to 40 nm, and wherein the optical film-forming pressure-sensitive adhesive layer has a haze of 1% or less when having a thickness of 23 μm.

2. The method for manufacturing an optical film-forming pressure-sensitive adhesive layer according to claim 1, wherein the drying step comprises:

a first drying step at a temperature of 40° C. to 110° C. and
a second drying step at a temperature of 100° C. to 160° C., and wherein the second drying step is at least 10° C. higher than the first drying step.

3. The method for manufacturing an optical film-forming pressure-sensitive adhesive layer according to claim 1, wherein the (meth)acryl-based polymer in the aqueous dis-

TABLE 1

| | Pressure-sensitive adhesive | | | | Drying step | | | | Evaluations | | |
| | | | | Volume | First | Second | | | | Visibility | |
| | | | Solid | average | drying | drying | Coating | | Smoothness: | | |
| | | Viscosity | concentration | particle diameter | step | step | speed | | Ra | | |
| | Type | (Pa·s) | (%) | (nm) | (° C.) | (° C.) | (m/min) | Haze (%) | (nm) | Normal | 45° |
|---|---|---|---|---|---|---|---|---|---|---|---|
| Example 1 | Aqueous dispersion type | 0.066 | 38 | 88 | 100 | 130 | 20 | 0.5 | 25 | ○ | ○ |
| Example 2 | Aqueous dispersion type | 0.066 | 38 | 88 | 100 | 130 | 50 | 0.5 | 17 | ○ | ○ |
| Example 3 | Aqueous dispersion type | 0.066 | 38 | 88 | 80 | 130 | 20 | 0.5 | 22 | ○ | ○ |
| Example 4 | Aqueous dispersion type | 0.066 | 38 | 88 | 60 | 130 | 25 | 0.5 | 22 | ○ | ○ |
| Example 5 | Aqueous dispersion type | 0.044 | 38 | 86 | 100 | 130 | 20 | 0.5 | 26 | ○ | ○ |
| Example 6 | Aqueous dispersion type | 0.070 | 50 | 130 | 100 | 130 | 20 | 0.7 | 31 | ○ | ○ |
| Example 7 | Aqueous dispersion type | 0.020 | 38 | 88 | 100 | 130 | 20 | 0.5 | 27 | ○ | ○ |
| Comparative Example 1 | Aqueous dispersion type | 0.150 | 60 | 1020 | 100 | 130 | 20 | 2.5 | 110 | x | x |
| Comparative Example 2 | Solvent type | 0.210 | 12 | — | 100 | 130 | 20 | 0.4 | 63 | x | x |
| Comparative Example 3 | Solvent type | 0.210 | 12 | — | 100 | 130 | 10 | 0.4 | 47 | Δ | Δ |
| Comparative Example 4 | Aqueous dispersion type | 0.230 | 20 | 92 | 100 | 130 | 20 | 0.8 | 50 | Δ | x |

What is claimed is:

1. A method for manufacturing an optical film-forming pressure-sensitive adhesive layer, comprising:

(1) applying an aqueous dispersion-type pressure-sensitive adhesive to a release film, wherein the aqueous dispersion-type pressure-sensitive adhesive comprises an aqueous dispersion containing a (meth)acryl-based polymer in the form of an aqueous dispersion;

wherein the aqueous dispersion-type pressure-sensitive adhesive has a viscosity of 0.01 Pa·s to 0.1 Pa·s at a shear rate of 4,000 (1/s), and then persion-type pressure-sensitive adhesive has a volume average particle diameter of up to 180 nm.

4. The method for manufacturing an optical film-forming pressure-sensitive adhesive layer according to claim 1, wherein the applying step (1) is performed at a coating speed of 10 m/minute to 100 m/minute.

5. The method for manufacturing an optical film-forming pressure-sensitive adhesive layer according to claim 1, wherein the aqueous dispersion-type pressure-sensitive adhesive is an aqueous dispersion with a solid concentration of 5% by weight to 45% by weight.

6. The method for manufacturing an optical film-forming pressure-sensitive adhesive layer according to claim 1, wherein the (meth)acryl-based polymer comprises 60 to 99.9% by weight of an alkyl (meth)acrylate and 0.1 to 10% by weight of a carboxyl group-containing monomer based on the total amount of all monomer units.

7. The method for manufacturing an optical film-forming pressure-sensitive adhesive layer according to claim 6, wherein the (meth)acryl-based polymer further comprises a phosphate group-containing monomer.

8. The method for manufacturing an optical film-forming pressure-sensitive adhesive layer according to claim 7, wherein the the phosphate-group containing monomer is 0.1 to 20% by weight based on the total amount of all monomer units.

9. The method for manufacturing an optical film-forming pressure-sensitive adhesive layer according to claim 8, wherein the alkoxysilyl group-containing monomer is selected from the group consisting of (meth)acryloyloxymethyl-trimethoxysilane; (meth)acryloyloxymethyl-triethoxysilane; 2-(meth)acryloyloxyethyl-trimethoxysilane; 2-(meth)acryloyloxyethyl-triethoxysilane; 3-(meth)acryloyloxypropyl-trimethoxysilane; 3-(meth)acryloyloxypropyl-triethoxysilane; 3-(meth)acryloyloxypropyl-tripropoxysilane; 3-(meth)acryloyloxypropyl-triisopropoxysilane; 3-(meth)acryloyloxypropyl-tributoxysilane; (meth)acryloyloxymethyl-methyldimethoxysilane; (meth)acryloyloxymethyl-methyldiethoxysilane; 2-(meth)acryloyloxyethyl-methyldimethoxysilane; 2-(meth)acryloyloxyethyl-methyldiethoxysilane; 3-(meth)acryloyloxypropyl-methyldimethoxysilane; 3-(meth)acryloyloxypropyl-methyldiethoxysilane; 3-(meth)acryloyloxypropyl-methyldipropoxysilane; 3-(meth)acryloyloxypropyl-methyldiisopropoxysilane; 3-(meth)acryloyloxypropyl-methyldibutoxysilane; 3-(meth)acryloyloxypropyl-ethyldimethoxysilane; 3-(meth)acryloyloxypropyl-ethyldiethoxysilane; 3-(meth)acryloyloxypropyl-ethyldipropoxysilane; 3-(meth)acryloyloxypropyl-ethyldiisopropoxysilane; 3-(meth)acryloyloxypropyl-ethyldibutoxysilane; 3-(meth)acryloyloxypropyl-propyldimethoxysilane; 3-(meth)acryloyloxypropyl-propyldiethoxysilane; vinyltrimethoxysilane; vinyltriethoxysilane; vinyltripropoxysilane; vinyltriisopropoxysilane; vinyltributoxysilane; vinylmethyltrimethoxysilane; vinylmethyltriethoxysilane; β-vinylethyltrimethoxysilane; β-vinylethyltriethoxysilane; γ-vinylpropyltrimethoxysilane; γ-vinylpropyltriethoxysilane; γ-vinylpropyltripropoxysilane; γ-vinylpropyltriisopropoxysilane; γ-vinylpropyltributoxysilane; (vinylalkyl)alkyldialkoxysilanes and (vinylalkyl)dialkyl(mono)alkoxysilanes.

10. The method for manufacturing an optical film-forming pressure-sensitive adhesive layer according to claim 7, wherein the phosphate group-containing monomer is represented by formula (1)

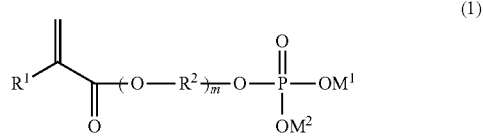

wherein $R^1$ represents a hydrogen atom or a methyl group, $R^2$ represents an alkylene group of 1 to 4 carbon atoms, m represents an integer of 2 to 40, and $M^1$ and $M^2$ each independently represent a hydrogen atom or a cation.

11. The method for manufacturing an optical film-forming pressure-sensitive adhesive layer according to claim 6, wherein the (meth)acryl-based polymer further comprises an alkoxysilyl group-containing monomer.

12. The method for manufacturing an optical film-forming pressure-sensitive adhesive layer according to claim 11, wherein the alkoxysilyl group-containing monomer is 0.001 to 1% by weight based on the total amount of all monomer units.

13. The method for manufacturing an optical film-forming pressure-sensitive adhesive layer according to claim 6, wherein the alkyl (meth)acrylate consist of 60 to 99.8% by weight of an alkyl acrylate and 0.1 to 39.9% by weight of an alkyl methacrylate.

14. The method for manufacturing an optical film-forming pressure-sensitive adhesive layer according to claim 13, wherein the alkyl acrylate has an alkyl group of 3 to 9 carbon atoms, and the alkyl methacrylate comprises one selected from the group consisting of methyl methacrylate, ethyl methacrylate, and cyclohexyl methacrylate.

15. The method for manufacturing an optical film-forming pressure-sensitive adhesive layer according to claim 6, wherein the carboxyl group-containing monomer is selected from the group consisting of (meth) acrylic acid, itaconic acid, maleic acid, fumaric acid, crotonic acid, carboxyethyl acrylate, and carboxypentyl acrylate.

16. The method for manufacturing an optical film-forming pressure-sensitive adhesive layer according to claim 1, wherein the viscosity is 0.02 Pa·s to 0.1 Pa·s at a shear rate of 4,000 (1/s).

\* \* \* \* \*